(12) United States Patent
Eversmann et al.

(10) Patent No.: US 11,371,954 B2
(45) Date of Patent: Jun. 28, 2022

(54) SENSING FROST AND ICE ACCUMULATION USING CAPACITANCE

(71) Applicant: TEXAS INSTRUMENTS INCORPORATED, Dallas, TX (US)

(72) Inventors: Bjoern Oliver Eversmann, Zolling (DE); Andreas Felix Martin Kraemer, Eichenau (DE); Michael Seidl, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1030 days.

(21) Appl. No.: 15/936,059

(22) Filed: Mar. 26, 2018

(65) Prior Publication Data

US 2019/0064097 A1   Feb. 28, 2019

Related U.S. Application Data

(60) Provisional application No. 62/552,911, filed on Aug. 31, 2017.

(51) Int. Cl.
*G01N 27/22* (2006.01)
*F25D 21/08* (2006.01)
(Continued)

(52) U.S. Cl.
CPC ......... *G01N 27/228* (2013.01); *F25D 21/006* (2013.01); *F25D 21/02* (2013.01); *F25D 21/08* (2013.01)

(58) Field of Classification Search
CPC ........ F25D 21/006; F25D 21/02; F25D 21/08; G01N 27/228
See application file for complete search history.

(56) References Cited

U.S. PATENT DOCUMENTS

| | | | |
|---|---|---|---|
| 2007/0023862 A1* | 2/2007 | Takagi | H01L 23/5227 257/531 |
| 2007/0273394 A1* | 11/2007 | Tanner | G01N 27/223 324/664 |

(Continued)

FOREIGN PATENT DOCUMENTS

| | | |
|---|---|---|
| CN | 1905361 A | 1/2007 |
| CN | 201514223 U | 6/2010 |

(Continued)

OTHER PUBLICATIONS

Search Report dated Aug. 4, 2021.

*Primary Examiner* — Son T Le
*Assistant Examiner* — Adam S Clarke
(74) *Attorney, Agent, or Firm* — Michael T. Gabrik; Charles A. Brill; Frank D. Cimino (57) ABSTRACT

A capacitance sensing system for sensing frost and ice accumulation. The capacitance sensing system comprises a first capacitor formed by a portion of a metal heat exchanger and a sensor electrode electrically isolated from the metal heat exchanger, a tank oscillator comprising a second capacitor and an inductor connected in parallel with each other and coupled in parallel with the first capacitor, and a circuit coupled to the tank oscillator. The circuit coupled to the tank oscillator is configured to determine a resonant frequency of the tank oscillator, determine a capacitance value based on the resonant frequency of the tank oscillator, determine that the capacitance value is greater than a predefined threshold, and transmit a heater activation command in response to determining the capacitance value is greater than the predefined threshold.

13 Claims, 6 Drawing Sheets

(51) Int. Cl.
*F25D 21/00* (2006.01)
*F25D 21/02* (2006.01)

(56) References Cited

U.S. PATENT DOCUMENTS

2012/0055181 A1* 3/2012 Kim .................. F25D 21/006
 62/80
2015/0027144 A1* 1/2015 Lee .................. F24D 19/1087
 62/80
2019/0331397 A1* 10/2019 Wang .................. F25D 21/06

FOREIGN PATENT DOCUMENTS

| CN | 102384614 A | 3/2012 |
| CN | 106500582 A | 3/2017 |
| CN | 205991659 U | 3/2017 |
| CN | 109038445 A * | 12/2018 |

* cited by examiner

SENSING FROST AND ICE ACCUMULATION USING CAPACITANCE

CROSS-REFERENCE TO RELATED APPLICATIONS

The present application claims priority to U.S. Provisional Patent Application No. 62/552,911, which was filed Aug. 31, 2017, is titled "Automated Continuous Monitoring Of Frost And Ice Formation On Heat Exchangers," and is hereby incorporated herein by reference in its entirety.

BACKGROUND

Refrigeration equipment provides cooling by heat exchange between cold outer surfaces of a heat exchanger with a fluid that is passed over the outer surface of the heat exchanger—for example, relatively warmer air. The warmer fluid loses energy to the relatively colder heat exchanger, thereby cooling the fluid. When the fluid is air, the eventuality of water vapor in the air condensing on the outer surface of the heat exchanger and forming frost and/or ice is possible.

SUMMARY

In accordance with at least one example of the disclosure, a capacitance sensing system for sensing frost and ice accumulation comprises a first capacitor formed by a portion of a metal heat exchanger and a sensor electrode electrically isolated from the metal heat exchanger, a tank oscillator comprising a second capacitor and an inductor connected in parallel with each other and coupled in parallel with the first capacitor, and a circuit coupled to the tank oscillator. The circuit coupled to the tank oscillator is configured to determine a resonant frequency of the tank oscillator, determine a capacitance value based on the resonant frequency of the tank oscillator, determine that the capacitance value is greater than a predefined threshold, and transmit a heater activation command in response to determining the capacitance value is greater than the predefined threshold.

In accordance with at least one example of the disclosure, a capacitance sensing system for sensing frost and ice accumulation comprises a first capacitor formed by a portion of a metal heat exchanger and a sensor electrode electrically isolated from the metal heat exchanger and a printed circuit board. The printed circuit board comprises a tank oscillator comprising a second capacitor and a planar spiral inductor connected in parallel with each other and coupled in parallel with the first capacitor and a capacitance-to-digital converter coupled to the tank oscillator.

In accordance with a least one example of the disclosure, a capacitance sensing system for sensing frost and ice accumulation comprises a first capacitor formed by a portion of a metal heat exchanger and a sensor electrode electrically isolated from the metal heat exchanger and a printed circuit board. The printed circuit board comprises a tank oscillator comprising a second capacitor and an inductor connected in parallel with each other and coupled in parallel with the first capacitor, a capacitance-to-digital converter coupled to the tank oscillator and configured to determine a capacitance value of the first and second capacitors and to output an indication of the capacitance value, and a processor coupled to the capacitance-to-digital converter. The processor is configured to receive the indication of the capacitance value output by the capacitance-to-digital converter and further configured to compare the indication of the capacitance value output by the capacitance-to-digital converter to a predefined threshold capacitance value, determine that the indication of the capacitance value output by the capacitance-to-digital converter exceeds the predefined threshold capacitance value, and transmit a heater activation command in response to determining that the capacitance value output by the capacitance-to-digital converter exceeds the predefined threshold capacitance value.

BRIEF DESCRIPTION OF THE DRAWINGS

For a detailed description of various examples, reference will now be made to the accompanying drawings in which.

DETAILED DESCRIPTION

Heat exchangers in refrigeration equipment accumulate frost and ice that interferes with efficient heat exchange between the surfaces of the heat exchanger and air flow. This frost and ice results from condensation of water vapor present in the air flowing over the heat exchanger's surfaces followed by freezing of the water droplets. As frost and ice builds up, cooling of the air by the heat exchanger's surfaces becomes progressively less efficient. In some systems a heater is provided which melts off the frost and ice accumulation. Some systems perform heat cycles in an open loop mode based on time, which results in either executing heating cycles prematurely or unnecessarily or executing heating cycles too infrequently. In either case, the result is diminished refrigeration or cooling efficiency. Other systems sense temperature changes over time and trigger a heating cycle when a change in temperature exceeds a predefined threshold. The temperature changes, however, are so slight that achieving the desired precision measurements to rely on this feedback as a heat cycle triggering mechanism is a challenge.

The present disclosure teaches establishing a capacitor having one plate provided by a portion of the surface of a metal heat exchanger and a second plate provided by an electrically isolated electrode positioned proximate to the metal heat exchanger. This capacitor can be characterized by a capacitance value that varies over time based on a changing dielectric strength of the capacitor, where this dielectric strength is a function of the amount of water, frost, and/or ice on the portion of the surface of the metal heat exchanger that provides one of the plates of this capacitor. By determining the capacitance value of this capacitor with high accuracy, a level of ice, frost, and/or water accumulation on the metal heat exchanger can be inferred. This capacitance value can further be used to initiate a heating cycle to melt and remove the accumulated frost and ice and to turn off the heating cycle. For example, as the sensed capacitance exceeds a capacitance threshold, the system turns on the heater. As the frost and ice melts, it turns into water. Water has a significantly higher dielectric constant than frost and ice. The sensed capacitance first rapidly increases a significant amount as frost and ice becomes water, and the sensed capacitance rapidly decreases a significant amount as water drains off the metal heat exchanger surfaces. Various criteria or rules can be defined for deciding when to turn off the heater.

Figure 1:
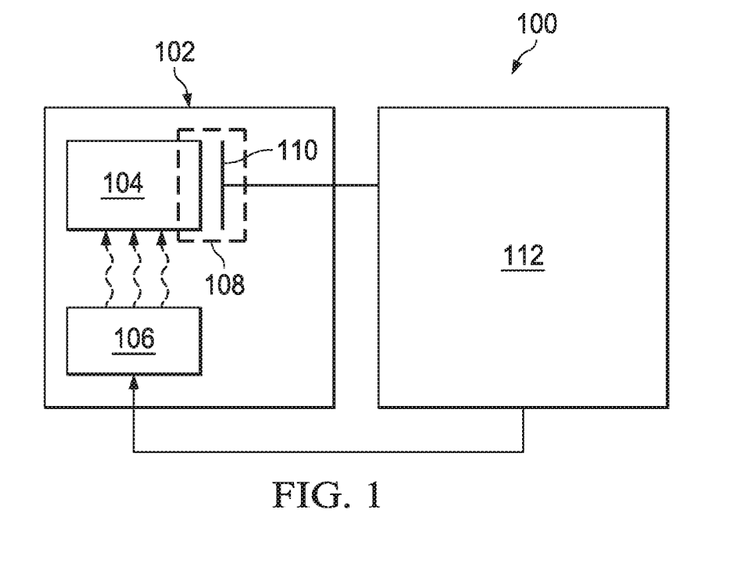
FIG. 1 shows a system for sensing frost and ice accumulation by capacitance sensing in accordance with various examples.

FIG. 1 shows an illustrative capacitance sensing system 100 for sensing frost and ice accumulation by capacitance sensing in accordance with various examples. The system comprises a refrigeration unit 102. In examples, the unit 102 comprises a metal heat exchanger 104 and a heater 106. In examples the metal heat exchanger 104 has metal surfaces but comprises other components that are not metal. In examples, the refrigeration unit 102 is a refrigerator, a freezer, or an air conditioner. When turned on, the heater 106 melts frost and ice that have accumulated on the surfaces of the metal heat exchanger 104. A capacitor 108 is formed by a portion of the surface of the metal heat exchanger 104 and a capacitance sensor electrode 110. The capacitance sensor electrode 110 takes a variety of forms. In examples, the capacitance sensor electrode 110 is located in close proximity to the surface of the metal heat exchanger 104. In examples, the capacitance sensor electrode 110 is planar in form. In examples, the capacitance sensor electrode 110 is sleeve-like in form. The system 100 further comprises a subsystem 112 that is configured to determine the capacitance value of the capacitor 108, compare the capacitance value to a predefined threshold, and turn the heater 106 on when the capacitance value meets or exceeds the predefined threshold. The subsystem 112 determines the capacitance value in a variety of ways. In examples, the subsystem 112 determines the capacitance value of the capacitor 108 by determining a resonant frequency of a tank oscillator 410 that includes the capacitor 108. In examples, the subsystem 112 determines the capacitance value of the capacitor 108 by charging the capacitor 108 to a first known voltage and discharge the capacitor 108 through a known resistance to a ground, measure the time it takes to discharge from the first known voltage to a second known voltage and determine the capacitance value based on these known values. In examples, the subsystem 112 determines the capacitance value of capacitor 108 using other methods of measuring capacitance.

In examples, the subsystem 112 further turns off the heater 106 when a criteria or rule is satisfied. For example, the subsystem 112 turns off the heater 106 after a predefined time interval has run since turning on the heater 106. For example, the subsystem 112 turns off the heater 106 after the capacitance value rises to a maximum value and begins to decrease. For example, the subsystem 112 turns off the heater 106 after the capacitance value rises to a maximum value, decreases rapidly to a lower capacitance value, and then maintains a stable capacitance value. In examples, other criteria are used for triggering turning off the heater 106.

Figure 2:
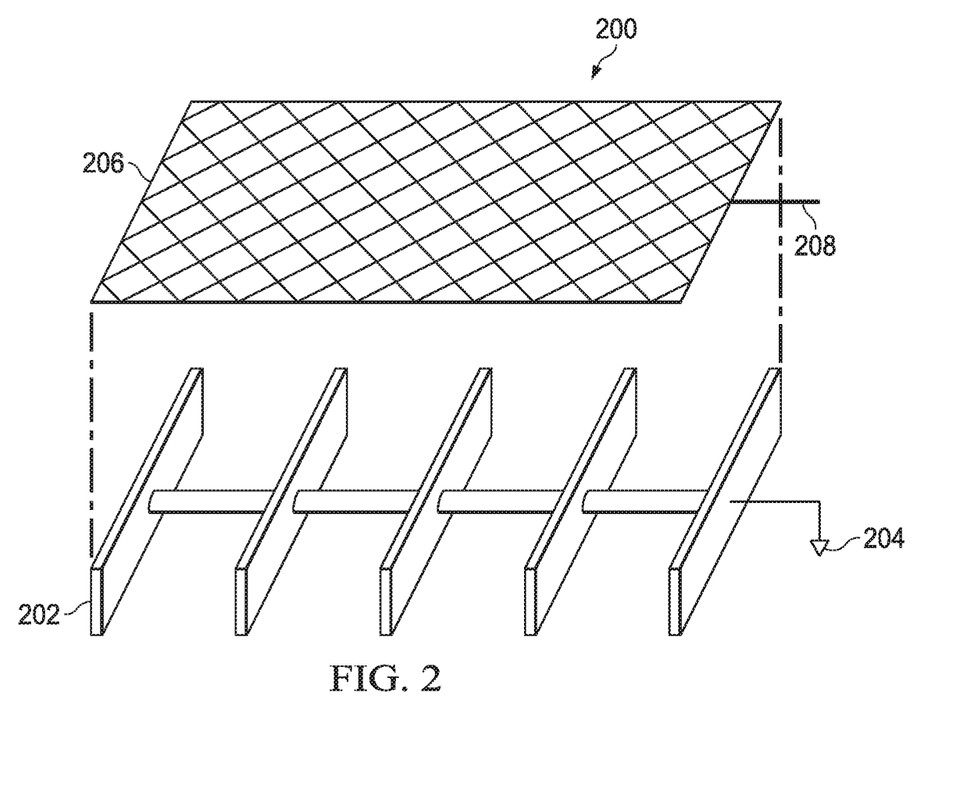
FIG. 2 shows a heat exchanger and capacitance sensor electrode in accordance with various examples.

FIG. 2 shows an illustrative capacitor 200. The capacitor 200 comprises a portion of a surface of a metal heat exchanger 202 that is electrically connected to ground 204. In examples, the ground 204 is a connection to a chassis of an enclosing system, such as a refrigeration unit. In examples, the ground 204 is a connection to a common wire in the enclosing system, such as a refrigeration unit. The capacitor 200 further comprises a capacitance sensor electrode 206 that is formed from a mesh of wires (e.g., a mesh of interconnected wires). In examples the mesh of wires comprises metal. In examples the mesh of wires comprises copper, stainless steel, and/or aluminum. The capacitance sensor electrode 206 is connected to an external lead 208 that promotes connecting to external circuitry (not explicitly shown).

Figure 3:
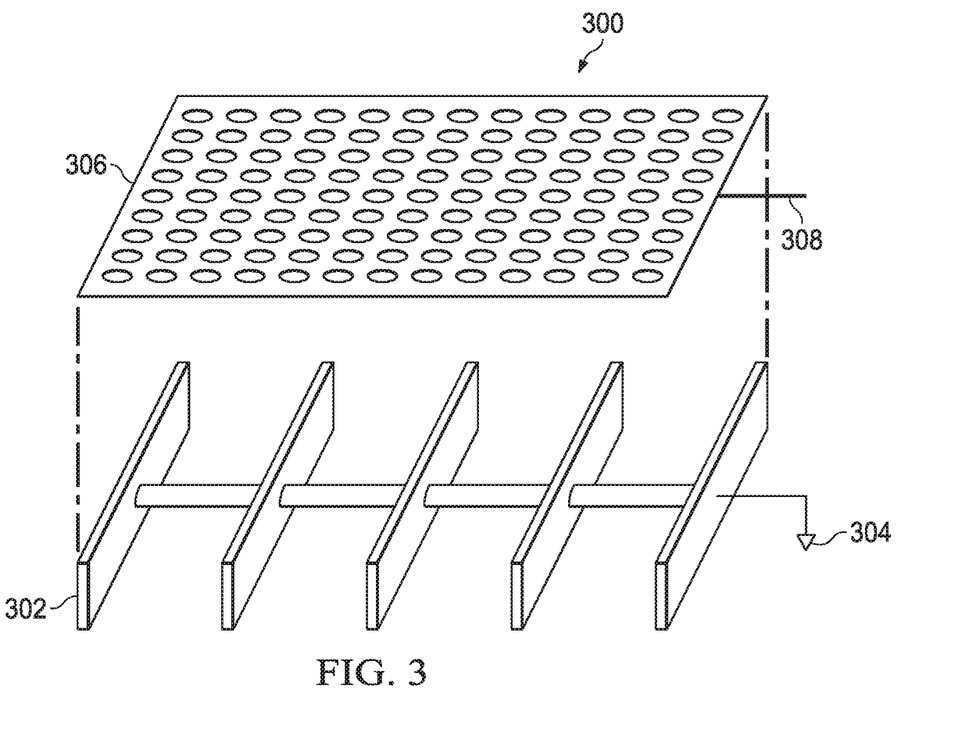
FIG. 3 shows a heat exchanger and another capacitance sensor electrode in accordance with various examples.

FIG. 3 shows an illustrative capacitor 300. The capacitor 300 comprises a portion of a surface of a metal heat exchanger 302 that is electrically connected to ground 304. In examples, the ground 304 is a connection to a chassis of an enclosing system, such as a refrigeration unit. In examples, the ground 304 is a connection to a common wire in the enclosing system, such as a refrigeration unit. The capacitor 300 further comprises a capacitance sensor electrode 306 that is formed by perforating a sheet of metal and then stretching the perforated sheet of metal. In examples, the perforated sheet of metal comprises copper, stainless steel, and/or aluminum. The capacitance sensor electrode 306 is connected to an external lead 308 that promotes connecting to external circuitry (not explicitly shown). It is desirable that the capacitance sensor electrode 206, 306 are open and provide free flow through of air.

Figure 4:
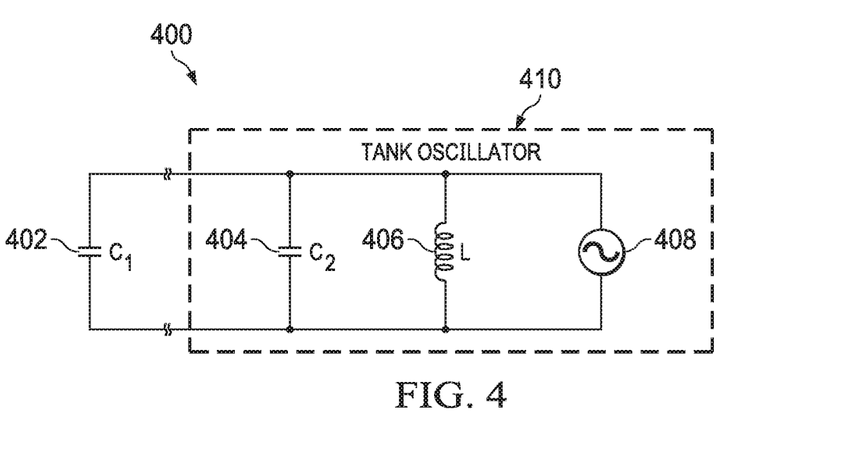
FIG. 4 shows a capacitance sensing circuit in accordance with various examples.

FIG. 4 shows an illustrative capacitance sensing circuit 400. The circuit 400 comprises a first capacitor 402 (e.g., such as the capacitors described in FIGS. 1-3), and a tank oscillator 410. The tank oscillator 410 comprises a second capacitor 404, an inductor 406, and a variable frequency oscillator 408. The first capacitor 402, the second capacitor 404, and the inductor 406 are all in parallel with each other. The resonant frequency of the capacitance sensing circuit 400 depends on the inductance value of the inductor 406 and on the aggregate capacitance of the first capacitor 402 in parallel with the second capacitor 404. The first capacitor 402 is shown separated from the right-hand of the circuit to suggest that the first capacitor 402 can be located remotely from the remainder of the circuit 400. This remote location does not change the nature of the function of this circuit 400. The frequency of the variable frequency oscillator 408 can be varied or swept across a range of frequencies to find the resonant frequency of the capacitance sensing circuit. In examples an integrated circuit separate from the capacitance sensing circuit 400 controls the variable frequency oscillator 408 to sweep a frequency input to the tank oscillator across a range of frequencies.

Because the capacitance of the second capacitor 404 is known, the inductance of the inductor 406 is known, and the frequency of the oscillator 408 is known as it is swept across a range of frequencies, the unknown capacitance value of the first capacitance can be determined based on the known values of resonant frequency, inductance, and capacitance of the second capacitor 404. More specifically, the capacitance of the first capacitor can be determined from the equation for resonant frequency:

$$F = \frac{1}{2\pi\sqrt{LC}} \quad \text{EQ 1}$$

where F is the resonant frequency, L is the inductance value of the inductor 406, and C is the aggregate capacitance of the first capacitor 402 and the second capacitor 404. This equation can be transformed to find the capacitance of the first capacitor as:

$$C_1 = \frac{\left(\frac{1}{2\pi F}\right)^2}{L} - C_2 \quad \text{EQ 2}$$

where F is the resonant frequency, L is the inductance value of the inductor 406, $C_1$ is the capacitance value of the first capacitor 402, $C_2$ is the capacitance value of the second capacitor 404, and $C = C_1 + C_2$.

Figure 5:
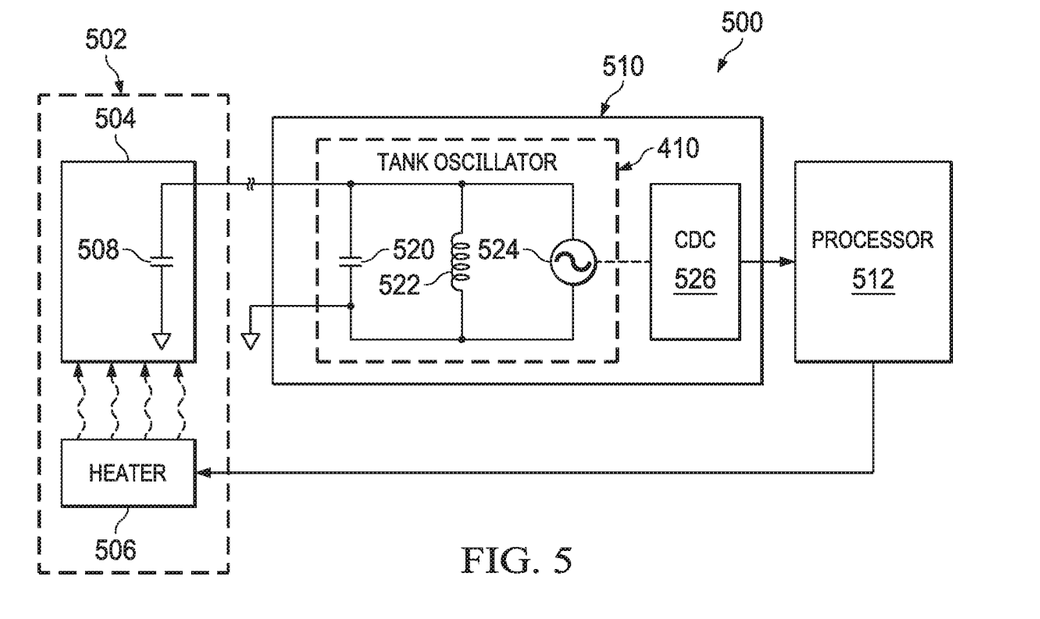
FIG. 5 shows another system for sensing frost and ice accumulation by capacitance sensing in accordance with various examples.

FIG. 5 shows another illustrative system 500 for sensing frost and ice accumulation by capacitance sensing in accordance with various examples. The system 500 comprises a refrigeration unit 502 that comprises a metal heat exchanger 504 and a heater 506. A first capacitor 508 is formed by a portion of a surface of the metal heat exchanger 504 and a capacitance sensor electrode, although the capacitor 508 is represented here with a capacitor symbol for ease of understanding.

The first capacitor 508 is coupled to a capacitance sensing circuit 510. A tank oscillator 410 comprises a second capacitor 520, inductor 522, and an adjustable frequency oscillator 524. The second capacitor 520, the inductor 522, and the adjustable frequency oscillator 524 are all connected in parallel with each other and in parallel with the first capacitor 508. The cut-line between the first capacitor 508 and the capacitance sensing circuit 510 is used to illustrate that the coupling can occur over a distance. In examples, the distance separating the first capacitor 508 from the capacitance sensing circuit 510 ranges from one inch to one foot to ten feet. The capacitance sensing circuit 510 comprises a capacitance-to-digital converter 526 and the tank oscillator 410. In examples, the capacitance-to-digital converter 526 is an integrated circuit. In examples, the adjustable frequency oscillator 524 is integrated within the capacitance-to-digital converter 526.

The capacitance-to-digital converter 526 varies the frequency of the adjustable frequency oscillator 524 to find the resonant frequency of the tank oscillator 410 and the first capacitor 508. Based on the resonant frequency and based on the known inductance of the inductor 522, the capacitance-to-digital converter 526 determines the capacitance of the parallel combination of the first capacitor 508 and the second capacitor 520. In examples, the capacitance-to-digital converter 526 converts the capacitance of the parallel combination of the first capacitor 508 and the second capacitor 520 to a digital representation and outputs this digital representation of this aggregate capacitance value to a processor 512. In other examples, the capacitance-to-digital converter 526 determines the capacitance value of the first capacitor 508, digitizes that value, and outputs this digital representation of the capacitance of the first capacitor 508 to the processor 512.

In examples, the capacitance sensing circuit 510 is implemented as a printed circuit board (PCB). In examples, the capacitance sensing circuit 510 comprises a plurality of independent capacitance sensing channels, each comprising a capacitor in series with an inductor coupled to a frequency variable oscillator. Said in other words, in examples, the capacitance sensing circuit 510 comprises a plurality of the tank oscillators 410, and each different tank oscillator is coupled to a different channel of the capacitance-to-digital converter 526 (see FIG. 9 and associated text description hereinafter). In examples, multiple independent capacitance sensing channels share a single frequency variable oscillator. In examples, each of multiple independent sensing channels is associated with its own independent frequency variable oscillator. In examples, the inductor 522 is implemented as a planar spiral inductor. In examples, the inductor 522 is implemented as a planar spiral multilayer inductor. In examples, the capacitance sensing circuit 510 is able to provide a capacitance resolution of 200 femtofarads or less, 100 femtofarads or less, 50 femtofarads or less, or 10 femtofarads or less.

In examples, the processor 512 is a microcontroller (MCU) integrated circuit, a microprocessor (MPU) integrated circuit, a field programmable gate array (FPGA) integrated circuit, a complex programmable logic device (CPLD) integrated circuit, or an application specific integrated circuit (ASIC) integrated circuit. The processor 512 compares the digital representation of capacitance received from the capacitance-to-digital converter 526 and/or from the capacitance sensing circuit 510 to a predefined threshold value of capacitance. When the received capacitance value exceeds the predefined threshold value of capacitance, the processor 512 sends a heater turn on command to the heater 506. The processor 512 subsequently sends a heater turn off command to the heater 506 when a heater turn-off criterion is satisfied. The heater turn-off criterion may be referred to as a predefined heater turn-off criterion in some contexts. The heater turn-off criterion may be built into the logic that the processor 512 executes.

In examples, the processor 512 continues to monitor the digital representation of capacitance received from the capacitance sensing circuit 510 and sends a heater turn-off command to the heater 506 based on its monitoring of the digital representation of capacitance received. In examples, the processor 512 sends the heater turn-off command in response to monitoring the capacitance value increasing to a maximum and then beginning to decrease. In examples, the processor 512 sends the heater turn-off command in response to monitoring the capacitance value increasing to a maximum, decreasing to a minimum, and then becoming stable close to that minimum. In some contexts, a heater turn-on command is referred to as a heater activation command and a heater turn-off command is referred to as a heater deactivation command. In examples, the predefined heater turn-off criterion is the capacitance value increasing to a maximum and then beginning to decrease. In examples the predefined heater turn-off criterion is monitoring the capacitance value increasing to a maximum, decreasing to a minimum, and then becoming stable close to that minimum.

In examples, the determining of capacitance enables the system to determine when to turn the heater on and off so that cycles of heating the metal heat exchanger 504 are minimized, conserving energy and also reducing unnecessary audible noise that is associated with the heat cycles. Additionally, in examples, eliminating unnecessary heating cycles and/or reducing duration of heating cycles reduces stress on the mechanisms of the refrigeration unit 502, thereby extending the unit's life.

Figure 6:
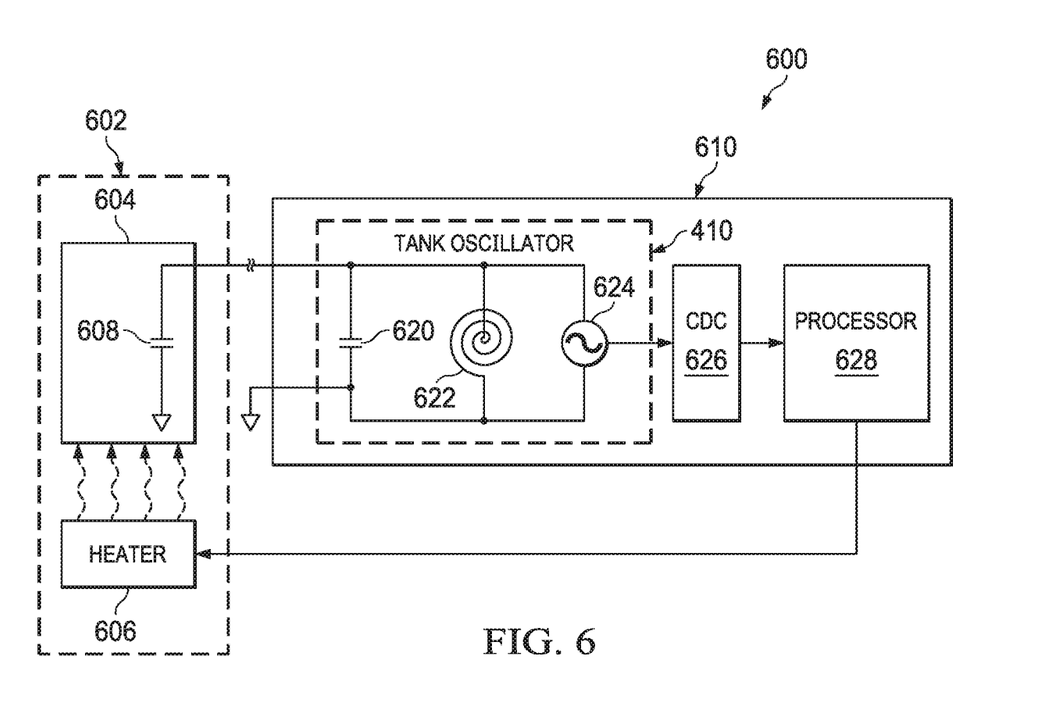
FIG. 6 shows yet another system for sensing frost and ice accumulation by capacitance sensing in accordance with various examples.

FIG. 6 shows yet another illustrative system 600 for sensing frost and ice accumulation by capacitance sensing in accordance with various examples. The system 600 comprises a refrigeration unit 602 that comprises a metal heat exchanger 604 and a heater 606. A first capacitor 608 is formed by a portion of a surface of the metal heat exchanger 604 and a capacitance sensor electrode.

The first capacitor 608 is coupled to a printed circuit board (PCB) 610. The PCB 610 comprises a tank oscillator 410. The tank oscillator 410 comprises a second capacitor 620, an inductor 622, and an adjustable frequency oscillator 624. The second capacitor 620, the inductor 622, and the adjustable frequency oscillator 624 are all connected in parallel with each other and in parallel with the first capacitor 608. The cut-line between the first capacitor 608 and the PCB 610 is used to suggest that the coupling can occur over a distance. In examples, the distance separating the first capacitor 608 from the PCB 610 ranges from one inch to one foot to ten feet. The PCB 610 further comprises a capacitance-to-digital converter 626. In examples, the capacitance-to-digital converter 626 is an integrated circuit. In examples, the adjustable frequency oscillator 624 is integrated within the capacitance-to-digital converter 626.

The capacitance-to-digital converter 626 varies the frequency of the adjustable frequency oscillator 624 to find the resonant frequency of the tank oscillator 410 and the first capacitor 608. Based on the resonant frequency and based on the known inductance of the inductor 622, the capacitance-to-digital converter 626 determines the capacitance of the parallel combination of the first capacitor 608 and the second capacitor 620. In examples, the capacitance-to-digital converter 626 converts the capacitance of the parallel combination of the first capacitor 608 and the second capacitor 620 to a digital representation and outputs this digital representation of this aggregate capacitance value to a processor 628. In other examples, the capacitance-to-digital converter 626 determines the capacitance value of the first capacitor 608, digitizes that value, and outputs this digital representation of the capacitance of the first capacitor 608 to the processor 628.

In examples, the PCB 610 comprises a plurality of independent capacitance sensing channels including a capacitor in series with an inductor coupled to a frequency variable oscillator. In examples, multiple independent capacitance sensing channels share a single frequency variable oscillator. In examples, each of multiple independent sensing channels is associated with its own independent frequency variable oscillator (see FIG. 10 and associated text description hereinafter). In examples, the inductor 622 is implemented as a planar spiral inductor. In examples, the inductor 622 is implemented as a planar spiral multilayer inductor. In examples, the PCB 610 is able to provide a capacitance resolution of 200 femtofarads or less, 100 femtofarads or less, 50 femtofarads or less, or 10 femtofarads or less.

In examples, the processor 628 is a microcontroller integrated circuit, a microprocessor integrated circuit, a field programmable gate array (FPGA) integrated circuit, a complex programmable logic device (CPLD) integrated circuit, or an application specific integrated circuit (ASIC) integrated circuit. The processor 628 compares the digital representation of capacitance received from the capacitance-to-digital converter 626 and/or from the PCB 610 to a predefined threshold value of capacitance. When the received capacitance value exceeds the predefined threshold value of capacitance, the processor 628 sends a heater turn-on command to the heater 606. The processor 628 subsequently sends a heater turn-off command to the heater 606 when a criterion is satisfied. In examples, the processor 628 continues to monitor the digital representation of capacitance received from the PCB 610 and sends a heater turn-off command to the heater 606 based on its monitoring of the digital representation of capacitance received. In examples, the processor 628 sends the heater turn-off command in response to monitoring the capacitance value increase rapidly to a relatively high maximum and then begin to decrease. In examples, the processor 628 sends the heater turn-off command in response to monitoring the capacitance value increase rapidly to a relatively high maximum, decrease sharply to a minimum, and then become stable close to that minimum. The processor 628 executes instructions or logic to determine the control signal sent to the heater 606 based on the digital representation of capacitance received from the capacitance sensing circuit 612. In examples, the processor 628 is located off of the PCB 610. In other examples, the processor 628 is located on the PCB 610.

Figure 7:
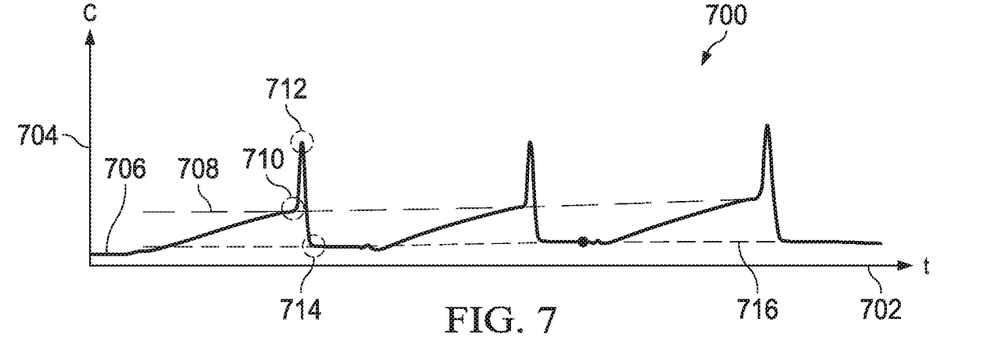
FIG. 7 shows a graph of capacitance versus time in accordance with various examples.

FIG. 7 shows an illustrative graph 700 of capacitance versus time in accordance with various examples. The graph 700 has an X-axis 702 or independent variable axis that corresponds to time and a Y-axis 704 or dependent variable axis that corresponds to capacitance. Over time frost and ice accumulate on the metal heat exchanger 104 of FIG. 1, which causes a sensed capacitance associated with the capacitor 108 formed by the portion of the surface of the metal heat exchanger 104 and the capacitance sensor electrode 110 to increase due to the increased dielectric constant associated with accumulated frost and ice. The sensed capacitance over time is shown as trace 706. At a predefined threshold value of capacitance 710, the heater 106 is commanded to be turned on, the frost and ice melt, the capacitance goes up rapidly to a peak value at 712 due to conversion of frost and ice to water which has a much higher dielectric constant than frost and ice. As heating continues, the capacitance then decreases rapidly toward the capacitance 714 as the water drains off of the surface of the metal heat exchanger 104 until the capacitance establishes a steady level 716 corresponding to a water-free, frost-free, ice-free surface of the metal heat exchanger 104.

In some examples, the steady level 716 of the capacitance of capacitor 108 varies slowly over time, for example over months or years. This variance can occur due to oxidation on a surface of the sensor electrode 110 and/or oxidation on the surface of the metal heat exchanger 104. Notwithstanding, in examples, the threshold 708 is automatically adapted, based on the slowly changing value of the steady level 716, to modulate heat cycles for defrosting and deicing the metal heat exchanger 104. Said in other words, the minimum capacitance value that occurs after turning off the heater is determined and deemed a clean or non-ice perturbed capacitance value. This clean capacitance value is then used to adapt the threshold 708. In examples, a specific increase in capacitance is associated with a corresponding thickness of ice and frost accumulation on the metal heat exchanger. Thus, in examples, the threshold 708 is adapted to have the value of this specific increase in capacitance added to the minimum capacitance value.

Figure 8:
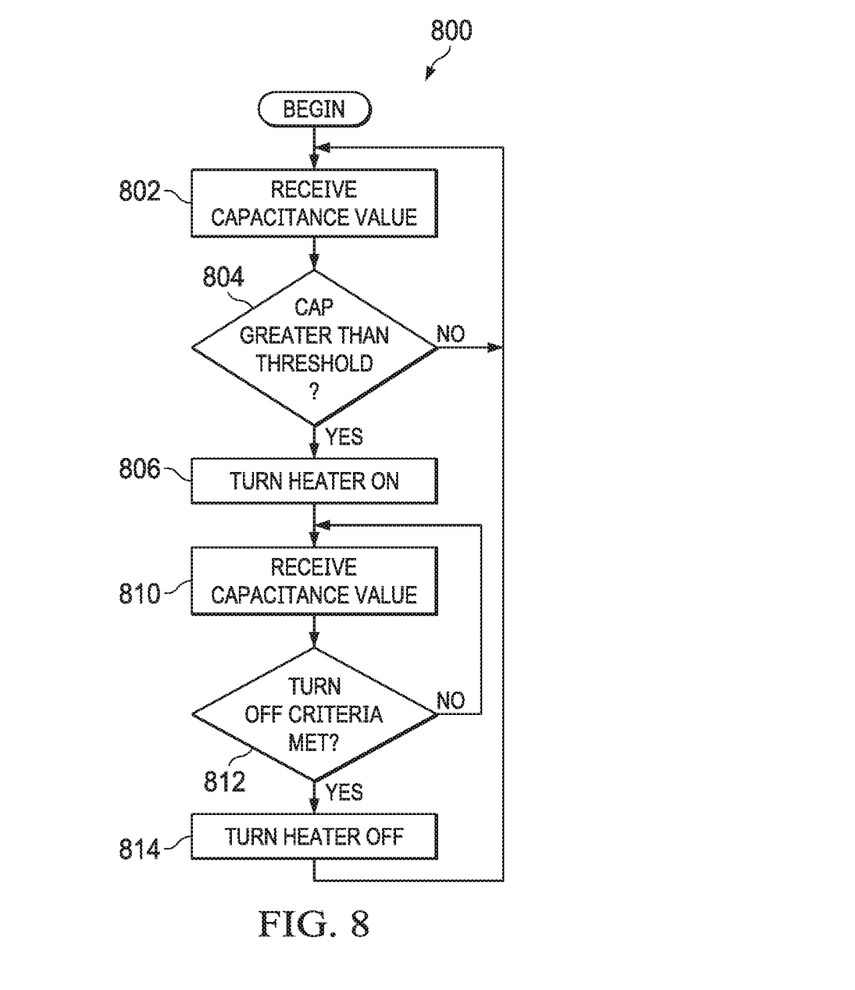
FIG. 8 shows a flow chart of a method in accordance with various examples.

FIG. 8 shows an illustrative flow chart of a method 800 in accordance with various examples. In examples, the method 800 is performed by the processor 512, 628. At block 802 a capacitance value is received. In examples, the capacitance value represents the capacitance value of the first capacitor 508, 608. In examples, the capacitance value represents the sum of the capacitance values of the first capacitor 508, 608 added with the capacitance value of the second capacitor 520, 620. The change in the sum of the capacitance values of the first capacitor 508, 608 added with the capacitance value of the second capacitor 520, 620 will change based largely on the change of the capacitance value of the first capacitor 508, 608 alone and hence this aggregate capacitance value still provides a reference against a threshold for triggering activation of the heater 506, 606.

At block 804, the received capacitance value is compared to a predefined threshold. If the received capacitance value is less than the predefined threshold, the processing returns to block 802. If the received capacitance value does exceed the predefined threshold, processing proceeds to block 806. At block 806, the heater is commanded to turn on.

At block 810, a capacitance value is received. The capacitance value that is received while the heater remains turned on is evaluated to see if a criteria or rule has been satisfied. A variety of criteria or rules are contemplated by the present disclosure. In examples, the criteria or rules specify that after the received value of capacitance manifests a rapid increase to a maximum and then drops, turn off the heater at that point or turn off the heater after a short time delay. In examples the criteria or rules specify that after the received value of capacitance manifests a rapid increase to a maximum, then drops to a value less than the predefined threshold for turning on the heater, and then achieves a stable value, then turn off the heater. After turning the heater off at block 814, the processing returns to block 802. The processing of method 800 continues from a power-on of the processor 512, 628 to power-off.

Figure 9:
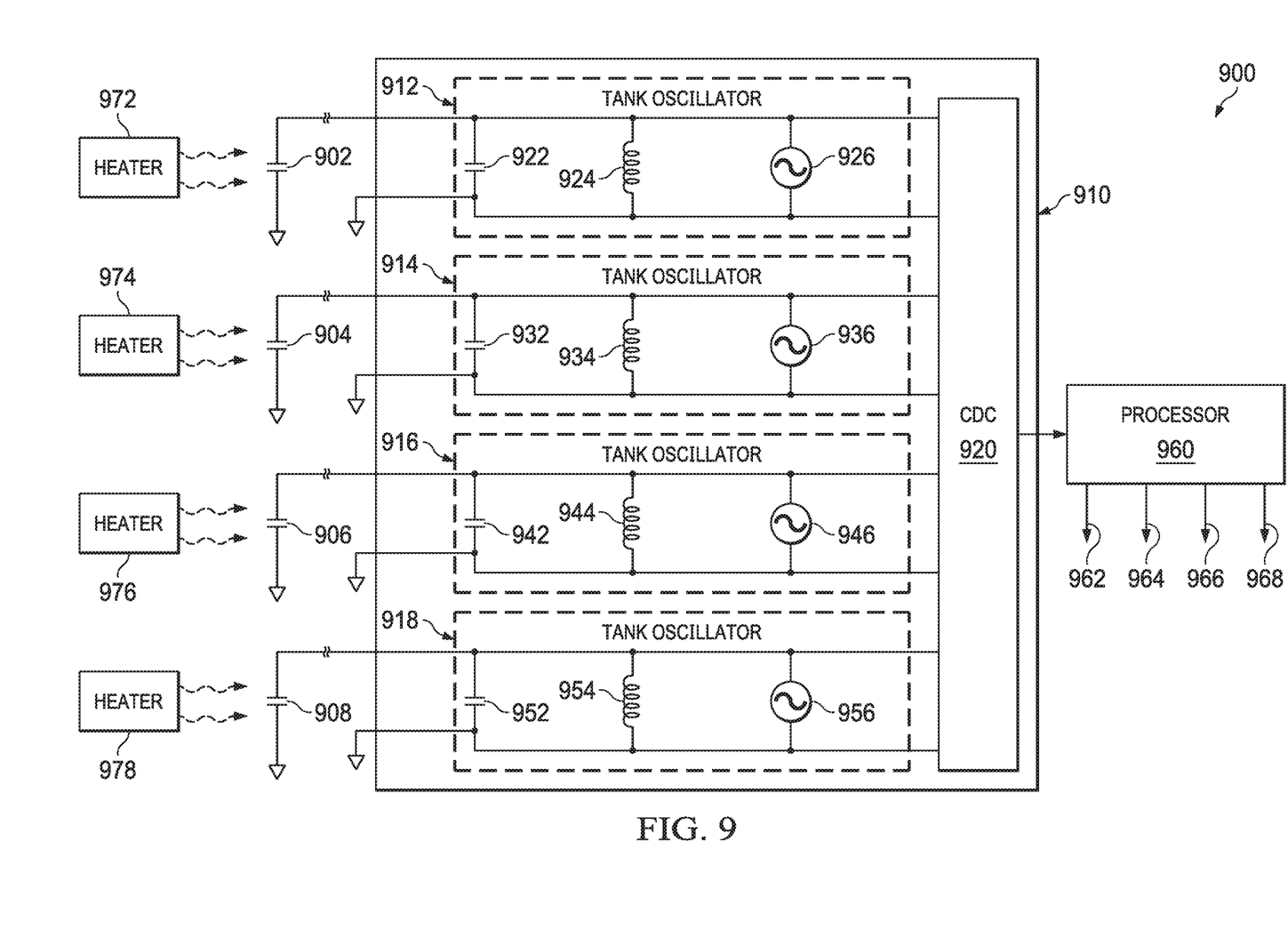
FIG. 9 shows a system for sensing frost and ice accumulation including a capacitance sensing circuit having a multiple channels of capacitance sensing in accordance with various examples.

FIG. 9 shows another illustrative system 900 for sensing frost and ice accumulation by capacitance sensing in accordance with various examples. The system 900 is substantially similar to the system 500 described above with reference to FIG. 5, except that in FIG. 9 a capacitance sensing circuit 910 comprises multiple separate tank oscillators each coupled to a separate external capacitance. While four separate tank oscillators are shown in FIG. 9 as part of the capacitance sensing circuit 910, in examples a different number of separate tank oscillators are part of the capacitance sensing circuit 910.

The system 900 comprises the capacitance sensing circuit 910. The capacitance sensing circuit 910 comprises a first tank oscillator 912, a second tank oscillator 914, a third tank oscillator 916, and a fourth tank oscillator 918. The first tank oscillator 912 comprises a capacitor 922, an inductor 924, and an oscillator 926; the second tank oscillator 914 comprises a capacitor 932, an inductor 934, and an oscillator 936; the third tank oscillator 916 comprises a capacitor 942, an inductor 944, and an oscillator 946; the fourth tank oscillator 918 comprises a capacitor 952, an inductor 954, and an oscillator 956. In examples, the capacitance sensing circuit 910 is a printed circuit board.

An external capacitance 902 associated with a heat exchanger is coupled in parallel to the first tank oscillator 912, and a heater 972 is configured to defrost the heat exchanger associated with the external capacitance 902. An external capacitance 904 associated with a heat exchanger is coupled in parallel to the second tank oscillator 914, and a heater 974 is configured to defrost the heat exchanger associated with the external capacitance 904. An external capacitance 906 associated with a heat exchanger is coupled in parallel to the third tank oscillator 916, and a heater 976 is configured to defrost the heat exchanger associated with the external capacitance 906. An external capacitance 908 associated with a heat exchanger is coupled in parallel to the fourth tank oscillator 918, and a heater 978 is configured to defrost the heat exchanger associated with the external capacitance 908. Each of the external capacitances 902, 904, 906, 908 is formed by a plate and a metal surface of a heat exchanger body, as described above with reference to FIG. 1, FIG. 2, and FIG. 3.

The capacitance sensing circuit 910 comprises a capacitance-to-digital converter (CDC) 920. In examples, the CDC 920 is an integrated circuit. The CDC 920 varies the frequency of the oscillators 926, 936, 946, 956, each in turn, to find the resonant frequency of its associated tank oscillator 912, 914, 916, 918 and capacitor 902, 904, 906, 908. In examples, the oscillators are not located external to the CDC 920 but instead are located within the CDC 920. In examples, the CDC 920 comprises a single oscillator and the CDC 920 connects the single oscillator to each of the tank oscillators 912, 914, 916, 918 one at a time in sequence, for example via a multiplexer. Based on the resonant frequencies of each tank oscillator 912, 914, 916, 918 and based on the known inductances of the inductors 924, 934, 944, 954, the CDC 920 determines the capacitances of the parallel combinations of the capacitors 902 and 922, of the capacitors 904 and 932, of the capacitors 906 and 942, and of the capacitors 908 and 954.

The CDC 920 outputs these capacitance values as a digital representation to a processor 960. In examples, the processor 960 is a microcontroller (MCU) integrated circuit, a microprocessor (MPU) integrated circuit, a field programmable gate array (FPGA) integrated circuit, a complex programmable logic device (CPLD) integrated circuit, or an application specific integrated circuit (ASIC) integrated circuit. The processor 920 compares the digital representations of the capacitance values received from the capacitance-to-digital converter 920 and/or from the capacitance sensing circuit 910 to a predefined threshold value of capacitance. When one of the received capacitance values exceeds a predefined threshold value of capacitance, the processor 960 sends a heater turn on command to the associated heater. In examples, different threshold values of capacitance may be predefined by the processor 920 for different ones of the capacitances 902, 904, 906, 908. The processor 960 is coupled by a first heater turn on line 962 to the heater 972, by a second heater turn on line 964 to the heater 974, by a third heater turn on line 966 to the heater 976, and by a fourth heater turn on line 968 to the fourth heater 978.

Figure 10:
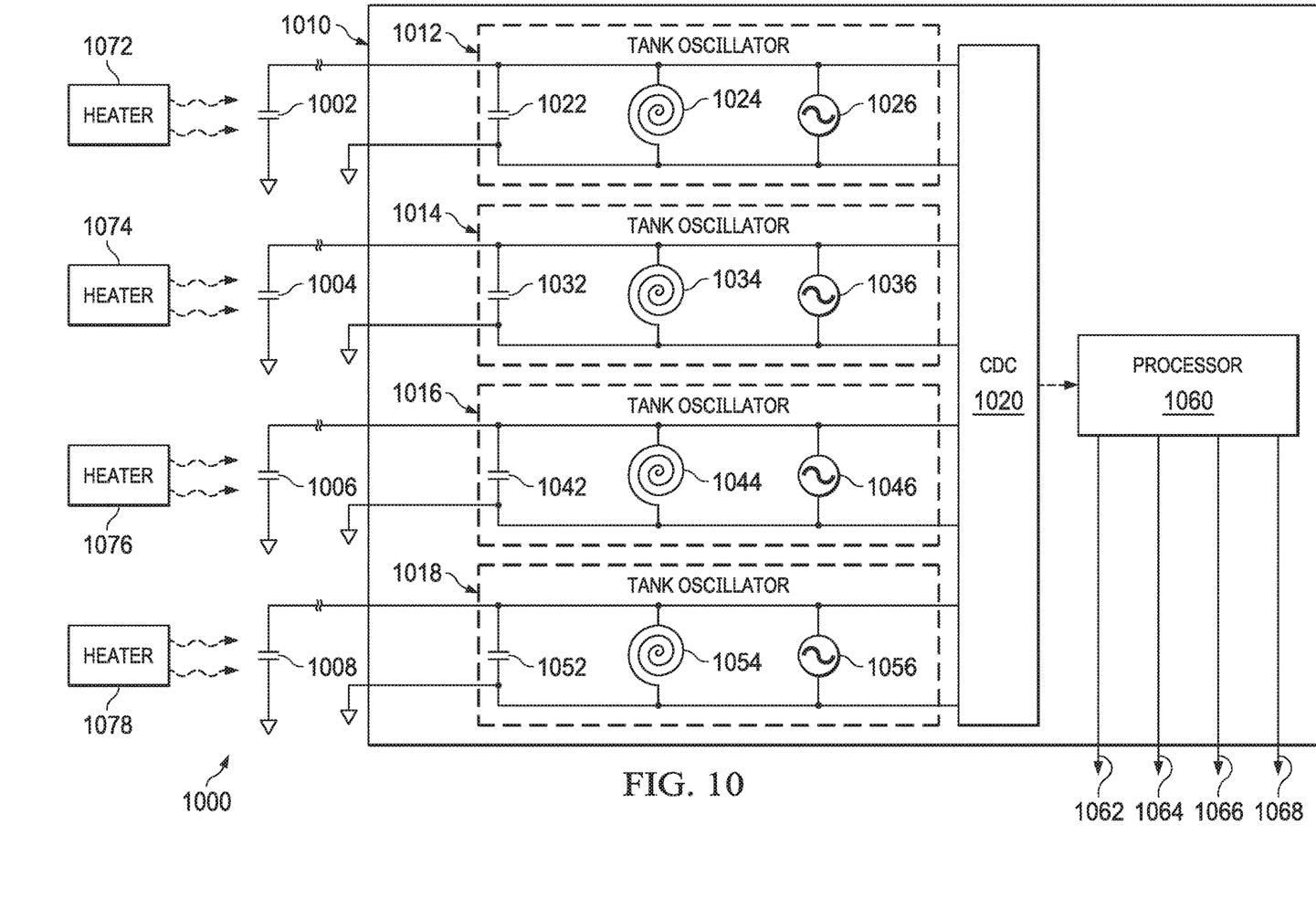
FIG. 10 shows another system for sensing frost and ice accumulation including a capacitance sensing circuit having a multiple channels of capacitance sensing in accordance with various examples.

FIG. 10 shows another illustrative system 1000 for sensing frost and ice accumulation by capacitance sensing in accordance with various examples. The system 1000 is substantially similar to the system 900 described above with reference to FIG. 9, except that in FIG. 10 the capacitance sensing circuit 1010 comprises a processor 1060. In an example, the capacitance sensing circuit 1010 is a printed circuit board. The system 1000 comprises multiple separate tank oscillators each coupled to a separate external capacitance. While four separate tank oscillators are shown in FIG. 10 as part of the capacitance sensing circuit 1010, in examples a different number of separate tank oscillators are part of the capacitance sensing circuit 1010.

The system 1000 comprises a capacitance sensing circuit 1010. The capacitance sensing circuit comprises a first tank oscillator 1012, a second tank oscillator 1014, a third tank oscillator 1016, and a fourth tank oscillator 1018. The first tank oscillator 1012 comprises a capacitor 1022, an inductor 1024, and an oscillator 1026; the second tank oscillator 1014 comprises a capacitor 1032, an inductor 1034, and an oscillator 1036; the third tank oscillator 1016 comprises a capacitor 1042, an inductor 1044, and an oscillator 1046; the fourth tank oscillator 1018 comprises a capacitor 1052, an inductor 1054, and an oscillator 1056.

An external capacitance 1002 associated with a heat exchanger is coupled in parallel to the first tank oscillator 1012, and a heater 1072 is configured to defrost the heat exchanger associated with the external capacitance 1002. An external capacitance 1004 associated with a heat exchanger is coupled in parallel to the second tank oscillator 1014, and a heater 1074 is configured to defrost the heat exchanger associated with the external capacitance 1004. An external capacitance 1006 associated with a heat exchanger is coupled in parallel to the third tank oscillator 1016, and a heater 1076 is configured to defrost the heat exchanger associated with the external capacitance 1006. An external capacitance 1008 associated with a heat exchanger is coupled in parallel to the fourth tank oscillator 1018, and a heater 1078 is configured to defrost the heat exchanger associated with the external capacitance 1008. Each of the external capacitances 1002, 1004, 1006, 1008 is formed by a plate and a metal surface of a heat exchanger body, as described above with reference to FIG. 1, FIG. 2, and FIG. 3.

The capacitance sensing circuit 1010 comprises a capacitance-to-digital converter (CDC) 1020. In examples, the CDC 1020 is an integrated circuit. The CDC 1020 varies the frequency of the oscillators 1026, 1036, 1046, 1056, each in turn, to find the resonant frequency of its associated tank oscillator 1012, 1014, 1016, 1018 and capacitor 1002, 1004, 1006, 1008. In examples, the oscillators are not located external to the CDC 1020 but instead are located within the CDC 1020. In examples, the CDC 1020 comprises a single oscillator and the CDC 1020 connects the single oscillator to each of the tank oscillators 1012, 1014, 1016, 1018 one at a time in sequence, for example via a multiplexer. Based on the resonant frequencies of each tank oscillator 1012, 1014, 1016, 1018 and based on the known inductances of the inductors 1024, 1034, 1044, 1054, the CDC 1020 determines the capacitances of the parallel combinations of the capacitors 1002 and 1022, of the capacitors 1004 and 1032, of the capacitors 1006 and 1042, and of the capacitors 1008 and 1054.

The CDC 1020 outputs these capacitance values as a digital representation to a processor 1060. In examples, the processor 1060 is a microcontroller (MCU) integrated circuit, a microprocessor (MPU) integrated circuit, a field programmable gate array (FPGA) integrated circuit, a complex programmable logic device (CPLD) integrated circuit, or an application specific integrated circuit (ASIC) integrated circuit. The processor 1020 compares the digital representations of the capacitance values received from the capacitance-to-digital converter 1020 and/or from the capacitance sensing circuit 1010 to a predefined threshold value of capacitance. When one of the received capacitance values exceeds a predefined threshold value of capacitance, the processor 1060 sends a heater turn on command to the associated heater. In examples, different threshold values of capacitance may be predefined by the processor 1060 for different ones of the capacitances 1002, 1004, 1006, 1008. The processor 1060 is coupled by a first heater turn on line 1062 to the heater 1072, by a second heater turn on line 1064 to the heater 1074, by a third heater turn on line 1066 to the heater 1076, and by a fourth heater turn on line 1068 to the fourth heater 1078.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection can be through a direct connection or through an indirect connection via other devices and connections.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A capacitance sensing system for sensing frost and ice accumulation, comprising:
a first capacitor formed by a portion of a metal heat exchanger and a sensor electrode electrically isolated from the metal heat exchanger; and
a printed circuit board comprising:
a tank oscillator comprising a second capacitor having first and second terminals and a planar spiral inductor having first and second terminals, the first terminals of the second capacitor and the planar spiral inductor coupled to a first node of the tank oscillator and the second terminals of the second capacitor and the planar spiral inductor coupled to a second node of the tank oscillator, the first capacitor coupled between the first and second nodes of the tank oscillator; and
a capacitance-to-digital converter coupled to the tank oscillator.

2. The capacitance sensing system of claim 1, wherein the printed circuit board comprises multiple of the tank oscillators, each of the tank oscillators coupled to a different channel of the capacitance-to-digital converter.

3. The capacitance sensing system of claim 1, wherein the metal heat exchanger is a part of a refrigeration unit.

4. The capacitance sensing system of claim 1, wherein the capacitance-to-digital converter is configured to determine a capacitance value of the first and second capacitors and to output an indication of the capacitance value.

5. The capacitance sensing system of claim 1, wherein the sensor electrode comprises a mesh of wires.

6. The capacitance sensing system of claim 1, wherein the capacitance-to-digital converter is configured to sweep a frequency input of the tank oscillator across a range of frequencies to identify a resonant frequency of the tank oscillator and to determine a capacitance value based on the resonant frequency of the tank oscillator.

7. A capacitance sensing system for sensing frost and ice accumulation, comprising:
a first capacitor formed by a portion of a metal heat exchanger and a sensor electrode electrically isolated from the metal heat exchanger; and
a printed circuit board comprising:
a tank oscillator comprising a second capacitor having first and second terminals and an inductor having first and second terminals, the first terminals of the second capacitor and the planar spiral inductor coupled to a first node of the tank oscillator and the second terminals of the second capacitor and the planar spiral inductor coupled to a second node of the tank oscillator, the first capacitor coupled between the first and second nodes of the tank oscillator;
a capacitance-to-digital converter coupled to the tank oscillator and configured to determine a capacitance value of the first and second capacitors and to output an indication of the capacitance value; and a processor coupled to the capacitance-to-digital converter and configured to receive the indication of the capacitance value output by the capacitance-to-digital converter and further configured to:
  compare the indication of the capacitance value output by the capacitance-to-digital converter to a predefined threshold capacitance value;
  determine that the indication of the capacitance value output by the capacitance-to-digital converter exceeds the predefined threshold capacitance value; and
  transmit a heater activation command in response to determining that the capacitance value output by the capacitance-to-digital converter exceeds the predefined threshold capacitance value.

8. The capacitance sensing system of claim 7, wherein the processor is one of a microcontroller (MCU), a microprocessor (MPU), a field programmable gate array (FPGA), a complex programmable logic device (CPLD), or an application specific integrated circuit (ASIC).

9. The capacitance sensing system of claim 7, wherein the printed circuit board is able to resolve capacitance differences less than 100 femtofarads.

10. The capacitance sensing system of claim 7, wherein the inductor is a planar spiral multilayer inductor.

11. The capacitance sensing system of claim 7, wherein the sensor electrode comprises a mesh of wires.

12. The capacitance sensing system of claim 7, wherein the sensor electrode comprises perforated and stretched metal.

13. The capacitance sensing system of claim 7, wherein the metal heat exchanger is a part of a refrigeration unit.

* * * * *